(12) United States Patent
Maver

(10) Patent No.: US 10,577,080 B2
(45) Date of Patent: Mar. 3, 2020

(54) DUAL VALVE SYSTEMS FOR ACTUATOR CONTROL

(71) Applicant: Hamilton Sundstrand Corporation, Charlotte, NC (US)

(72) Inventor: Timothy Maver, Glastonbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 134 days.

(21) Appl. No.: 15/684,651

(22) Filed: Aug. 23, 2017

(65) Prior Publication Data

US 2019/0061916 A1 Feb. 28, 2019

(51) Int. Cl.
*B64C 11/40* (2006.01)
*F15B 20/00* (2006.01)
(Continued)

(52) U.S. Cl.
CPC ............ *B64C 11/40* (2013.01); *B64C 11/385* (2013.01); *F15B 20/008* (2013.01); *B63H 3/082* (2013.01); *F03D 7/0224* (2013.01); *F15B 2211/30565* (2013.01); *F15B 2211/8636* (2013.01); *F15B 2211/8752* (2013.01); *F15B 2211/8757* (2013.01)

(58) Field of Classification Search
CPC ......... F03D 7/0224; B63H 3/082; B63H 3/08; B63H 2003/088; B64C 11/40; B64C 11/38; B64C 11/385; B64C 11/42; F15B 2211/863; F15B 2211/8636; F15B 2211/864; F15B 2211/875; F15B 2211/8752; F15B 2211/8757; F15B 13/0402; F15B 13/044; F15B 2013/0413; F15B 20/008

See application file for complete search history.

(56) References Cited

U.S. PATENT DOCUMENTS 3,702,575 A * 11/1972 Campbell ................ F15B 9/09
                                                    91/363 A
4,097,189 A *  6/1978 Harlamert ............... B64C 11/38
                                                    416/154
(Continued)

FOREIGN PATENT DOCUMENTS

DE       102011119788 A1    6/2013
EP           2192307 A2     6/2010

OTHER PUBLICATIONS

Extended European Search Report, of the European Patent Office, dated Jan. 29, 2019, issued in corresponding European Patent Application No. 18190419.4.

*Primary Examiner* — Carl C Staubach
(74) *Attorney, Agent, or Firm* — Locke Lord LLP; Daniel J. Fiorello; Scott D. Wofsy

(57) ABSTRACT

A system for controlling propeller pitch in the event of electro-hydraulic servo valve (EHSV) failure can include an actuator and a selection valve in fluid communication with the actuator. The selection valve can be fluid communication with a first EHSV having a first null state bias configured to bias the actuator to an increased-pitch position, and a second EHSV having a second null state bias configured to bias the actuator to a decreased-pitch position. The selection valve can be configured to selectively allow fluid communication between one of the first EHSV and actuator and/or the second EHSV and the actuator.

11 Claims, 7 Drawing Sheets

(51) Int. Cl.
*B64C 11/38* (2006.01)
*F03D 7/02* (2006.01)
*B63H 3/08* (2006.01)

(56) References Cited

U.S. PATENT DOCUMENTS

| | | | |
|---|---|---|---|
| 5,186,608 A * | 2/1993 | Bagge | B64C 11/38 416/147 |
| 2004/0006981 A1* | 1/2004 | Dong | F16H 61/4043 60/464 |
| 2008/0169379 A1* | 7/2008 | Cotton | B64C 11/38 244/60 |
| 2010/0129214 A1* | 5/2010 | Wilson | B64C 11/385 416/31 |
| 2012/0134816 A1* | 5/2012 | Andersen | F03D 7/0224 416/31 |
| 2014/0007565 A1* | 1/2014 | Yamashita | E02F 9/128 60/431 |
| 2016/0084270 A1* | 3/2016 | Specks | E04G 21/0436 60/445 |

* cited by examiner

DUAL VALVE SYSTEMS FOR ACTUATOR CONTROL

BACKGROUND

1. Field

The present disclosure relates to valve systems, more specifically to dual valve systems for actuator control.

2. Description of Related Art

Propeller control architecture is complex and valve systems to control pitch can be unreliable. If a valve fails, the pitch valve can revert to a null state where it biases the propeller actuator to one position (e.g., high pitch) and the pitch cannot be controlled.

Such conventional methods and systems have generally been considered satisfactory for their intended purpose. However, there is still a need in the art for improved valve systems for actuator control. The present disclosure provides a solution for this need.

SUMMARY

In accordance with at least one aspect of this disclosure, an actuator system can include a pressure actuator having a piston, at least a first port and a second port, wherein the first port is on a first pressure side of the piston and the second port is on a second pressure side of the piston. The system includes a first valve and a second valve in selective fluid communication with the first port and the second port of the pressure actuator via at least one first port line and at least one second port line, each of the first and second valve having a first open state, a second open state, and a closed state such that the first open state allows a pressure differential between the first port and the second port such that the actuator is biased to an extended position when one of the first and second valves is in fluid communication with the actuator and in the first open state. The second open state allows a pressure differential between the first port and the second port such that the actuator is biased to a retracted position when one of the first and second valves is in fluid communication with the actuator and in the second open state.

The first valve includes a first null state in the event of a failure of the first valve such that first null state allows a pressure differential between the first port and the second port such that the actuator is biased to a first direction when the first valve is in fluid communication with the actuator and is in the first null state. The second valve includes a second null state in the event of a failure of the second valve such that second null state allows a pressure differential between the first port and the second port such that the actuator is biased to a second direction when the second valve is in fluid communication with the actuator and is in the second null state.

The system includes a selection valve in fluid communication between the actuator and the first and second valves. The selection valve is configured to move between at least a first selection state to select the first valve to fluidly communicate with the actuator and a second selection state to select the second valve to fluidly communicate with the actuator.

The actuator can be a propeller pitch actuator or any other suitable actuator. The first direction can be an increase-pitch direction. The second direction can be a decrease-pitch direction.

The system can include a main pump in fluid communication with to the first valve and second valve via a pump line. The system can include an auxiliary pump in fluid communication with the first valve and second valve via the pump line.

The system can include a low pressure line connected to the first valve and the second valve, wherein the low pressure line configured to carry a lower pressure than the pump line. In certain embodiments, the lower pressure can be an atmospheric pressure.

In certain embodiments, the system can include a return line in fluid communication with at least one of the first valve and the second valve for returning hydraulic fluid to a tank and/or to a low pressure pump side. The return line can be connected to the low pressure line. In certain embodiments, a cooling orifice can be connected between the pump line and the low pressure line.

The first valve and the second valve can be electro-hydraulic servo valves (EHSVs) and/or any other suitable valves and/or combinations thereof. The selection valve can be configured to be hydraulically actuated between the first selection position and the second selection position by being connected to the pump line on one side and selectively connected to the low pressure line via a solenoid and to the pump line via an orifice on another side. In certain embodiments, the selection valve can include a null state in the event of failure of the selection valve to such that the actuator is biased to a high pitch direction for feathering a propeller.

In accordance with at least one aspect of this disclosure, a system for controlling propeller pitch in the event of electro-hydraulic servo valve (EHSV) failure includes an actuator and a selection valve in fluid communication with the actuator. The selection valve can be fluid communication with a first EHSV having a first null state bias configured to bias the actuator to an increased-pitch position, and a second EHSV having a second null state bias configured to bias the actuator to a decreased-pitch position. The selection valve can be configured to selectively allow fluid communication between one of the first EHSV and actuator and/or the second EHSV and the actuator.

In accordance with at least one aspect of this disclosure, a method can include operating an actuator in an actuator control valve failure mode to control a position of the actuator by controlling a selection valve disposed between the actuator to select between a first actuator control valve and a second actuator control valve to select between an actuator extend bias of the first actuator control valve and an actuator deploy bias of the second actuator control valve. The method can include oscillating the position of the selection valve to maintain a predetermined range of actuator positions.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
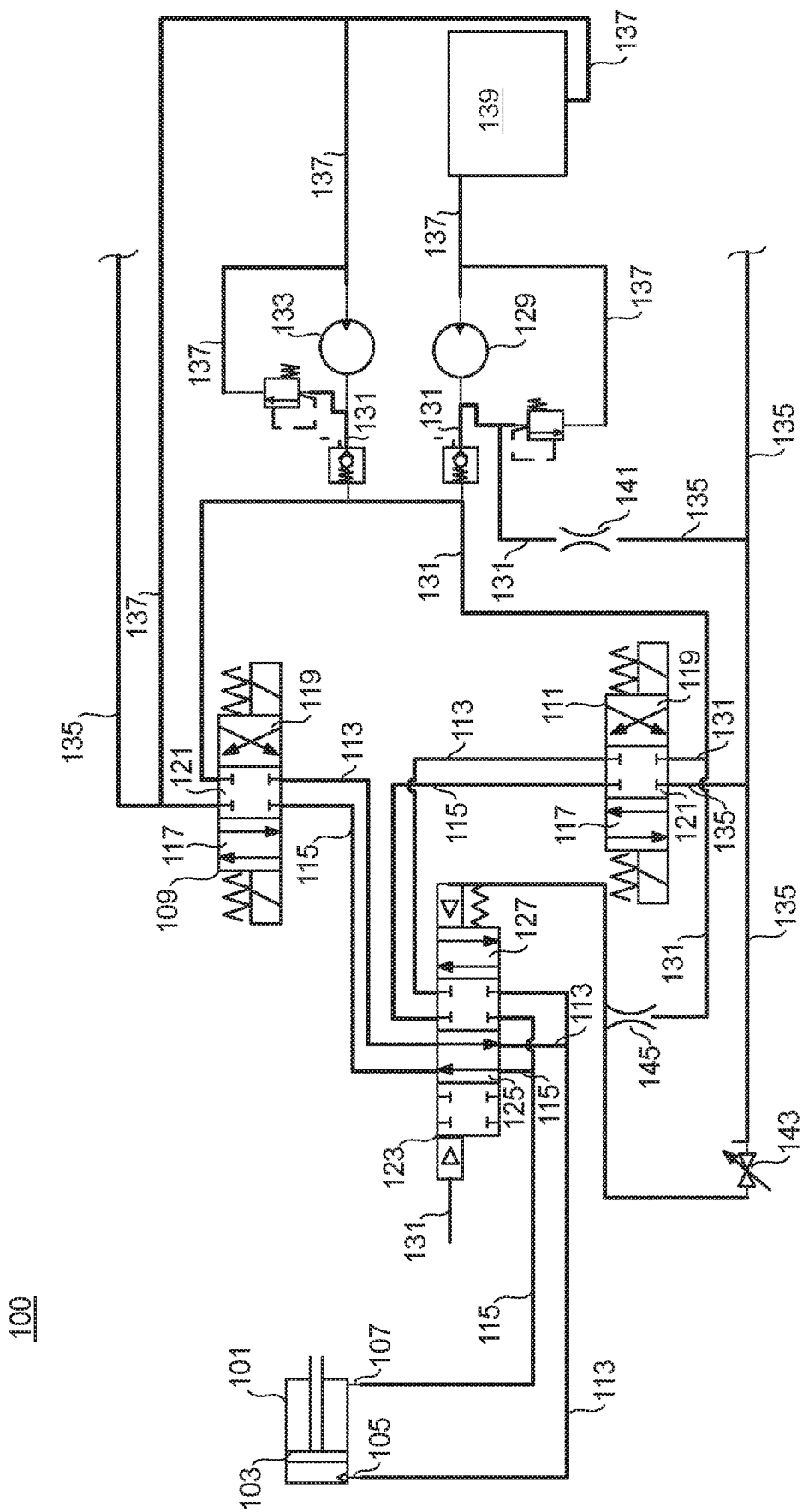
FIG. 1 is a schematic diagram of an embodiment of a system in accordance with this disclosure, showing the first valve and the second valve in a closed state, and the selection valve in a first selection state.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-7. The systems and methods described herein can be used to improve reliability and safety of actuator systems (e.g., for aircraft propeller pitch control systems).

In accordance with at least one aspect of this disclosure, an actuator system 100 can include a pressure actuator 101 having a piston 103 and at least a first port 105 and a second port 107. The first port 105 is on a first pressure side of the piston 101 and the second port 107 is on a second pressure side of the piston 103 such that a differential pressure between the first port 105 and the second port 107 causes actuation of the piston 103 as appreciated by those having ordinary skill in the art.

The system 100 includes a first valve 109 and a second valve 111 in selective fluid communication with the first port 105 and the second port 107 of the pressure actuator 101 via at least one first port line 113 and at least one second port line 115. Each of the first valve 109 and second valve 111 have at least a first open state 117, a second open state 119, and a closed state 121. The first open state 117 allows a pressure differential between the first port 105 and the second port 107 such that the actuator 101 is biased to an extended position when one of the first and second valves 109, 111 is in fluid communication with the actuator 101 and in the first open state 117. The second open state 119 allows a pressure differential between the first port 105 and the second port 107 such that the actuator 101 is biased to a retracted position when one of the first and second valves 109, 113 is in fluid communication with the actuator 101 and in the second open state 119.

Figure 6:
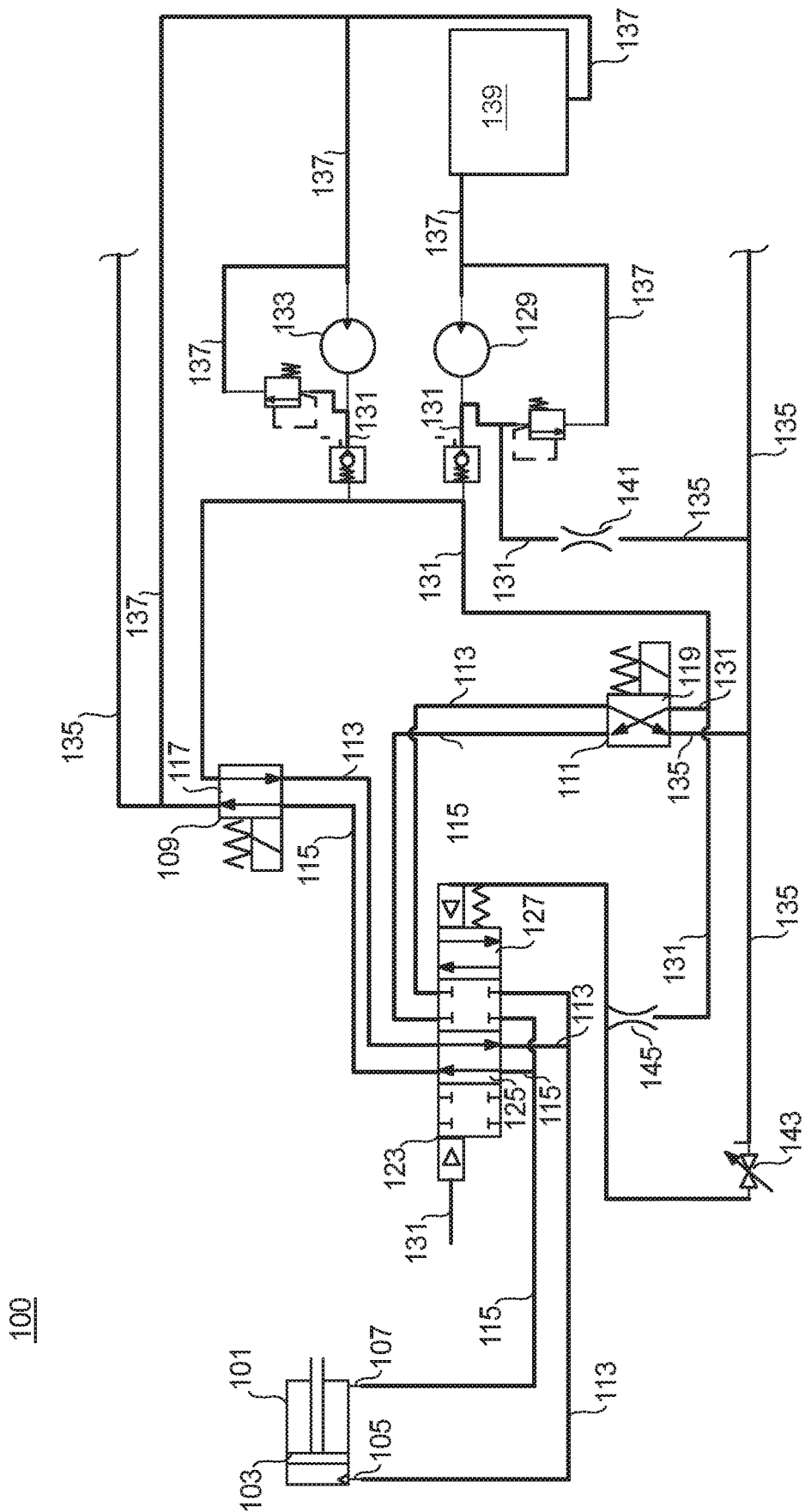
FIG. 6 is a schematic diagram the embodiment of FIG. 1, showing the first valve in a first null state, the second valve in a second null state, and the selection valve in a first selection state to bias the actuator in a first direction.
Figure 7:
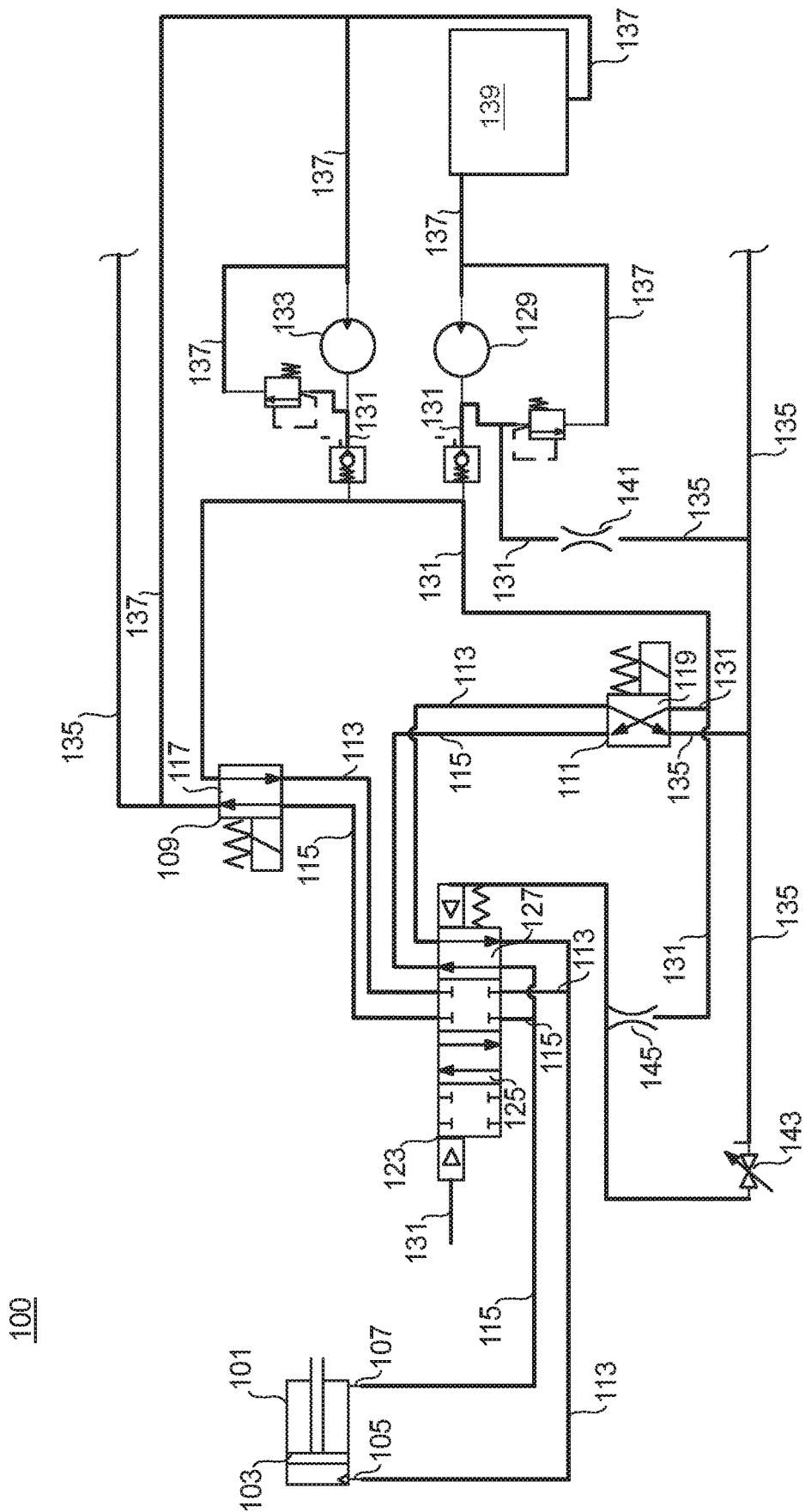
FIG. 7 is a schematic diagram the embodiment of FIG. 1, showing the first valve in a first null state, the second valve in a second null state, and the selection valve in a second selection state to bias the actuator in a second direction.

The first valve 109 includes a first null state (e.g., biased to the first open state in a failure mode as shown in FIGS. 6 and 7) in the event of a failure of the first valve 109 such that first null state allows a pressure differential between the first port 105 and the second port 107 such that the actuator 101 is biased to a first direction (e.g., the extended position) when the first valve 109 is in fluid communication with the actuator 101 and is in the first null state. The second valve 111 includes a second null state (e.g., biased to the second open state in a failure mode as shown in FIGS. 6 and 7) in the event of a failure of the second valve 111 such that second null state allows a pressure differential between the first port 105 and the second port 107 such that the actuator 101 is biased to a second direction (e.g., the retracted position) when the second valve 111 is in fluid communication with the actuator 101 and is in the second null state. In certain embodiments, the first direction and the second direction can be the same (e.g., a pitch up direction, or a pitch down direction).

The system 100 includes a selection valve 123 in fluid communication between the actuator 101 and the first and second valves 109, 111. The selection valve 123 is configured to move between at least a first selection state 125 to select the first valve 109 to fluidly communicate with the actuator 101 and a second selection state 127 to select the second valve 111 to fluidly communicate with the actuator 101.

The actuator 101 can be a propeller pitch actuator or any other suitable actuator. In certain embodiments, the first direction can be an increase-pitch direction and the second direction can be a decrease-pitch direction. The reverse and/or any other suitable arrangement is also contemplated.

The system 100 can include a main pump 129 in fluid communication with to the first valve 109 and second valve 111 via a pump line 131 and/or any other suitable lines. In certain embodiments, the system 101 can include an auxiliary pump 133 in fluid communication with the first valve 109 and second valve 111 via the pump line 131 and/or any other suitable back up lines.

The system 100 can include a low pressure line 135 connected to the first valve 109 and the second valve 111. The low pressure line 135 can be configured to carry a lower pressure than the pump line 131. In certain embodiments, the lower pressure can be an atmospheric pressure, for example.

In certain embodiments, the system 100 can include a return line 137 in fluid communication with at least one of the first valve 109 and the second valve 111 for returning hydraulic fluid to a tank 139 and/or to a low pressure pump side as shown. In certain embodiments, the tank 139 can include an input (not shown) for receiving a hydraulic fluid (e.g., engine oil from a lube pressure line) such that the system 100 as shown is not a closed loop system. The return line 137 can be configured to return fluid to any suitable location (e.g., a gearbox). The return line 137 can be connected to the low pressure line 135 in certain embodiments, e.g., as shown. In certain embodiments, a cooling orifice 141 can be connected between the pump line 131 and the low pressure line 135 for any suitable purpose as appreciated by those having ordinary skill in the art.

The first valve 109 and the second valve 111 can be electro-hydraulic servo valves (EHSVs) and/or any other suitable valves and/or combinations thereof. An EHSV is an electro-hydraulic servo valve that is driven by electric servo that controls position of the valve. An EHSV can have dual power sources, but may be simplified to a single channel servo as appreciated by those having ordinary skill in the art. An suitable type of valve is contemplated herein.

The selection valve 123 can be configured to be hydraulically actuated between the first selection position 125 and the second selection position 127 by being connected to the pump line 131 on one side, and selectively connected to the low pressure line 135 via a solenoid valve 143 (or any other suitable valve) and/or to the pump line 131 via an orifice 145 on another side of the selection valve 123. In certain embodiments, a control system can be connected to the solenoid valve 143 to operate the solenoid valve 143 and thus control the position of the selection valve 123 based on any suitable data. In certain embodiments, the control system and/or any other suitable control system can be operatively connected to one or both of the first valve 109 and/or the second valve 111 to control the position thereof. Any other suitable control mechanism and/or control scheme for any and/or all of the valves is contemplated herein.

In certain embodiments, the selection valve 123 can include a null state (e.g., where solenoid valve 143 has failed) such that the actuator is biased to a known position (e.g., a high pitch direction for feathering a propeller). For example, the selection valve 123 can be biased to the first selection state 125 to select the first valve 109 such that even if the both the first valve 109 and the selection valve 123 have failed, the propeller would be biased to an increased pitch. Any selection valve and/or control mechanism and/or control scheme therefor is contemplated herein.

Figure 2:
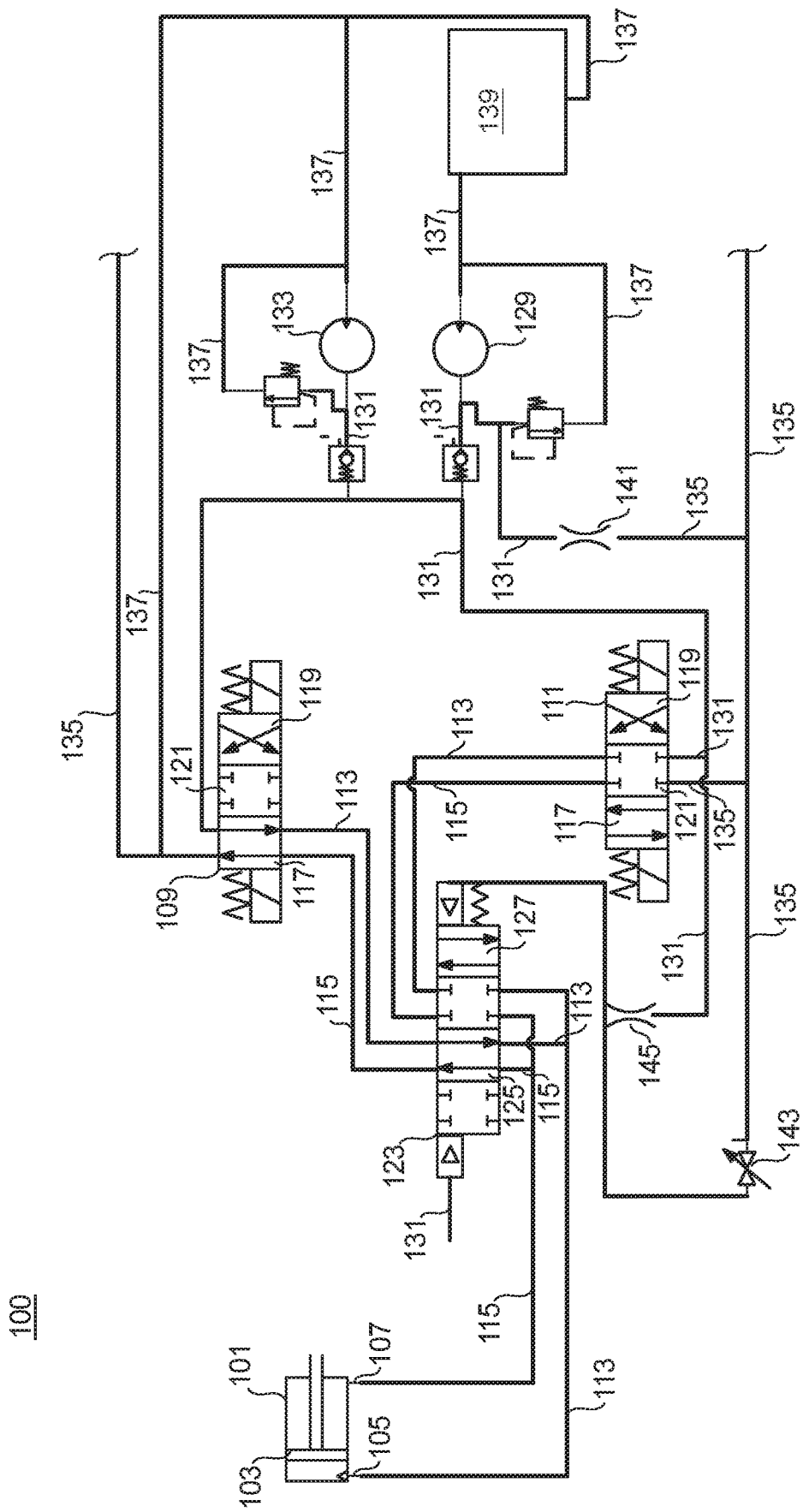
FIG. 2 is a schematic diagram the embodiment of FIG. 1, showing the first valve in a first open state, the second valve in a closed state, and the selection valve in a first selection state.
Figure 3:
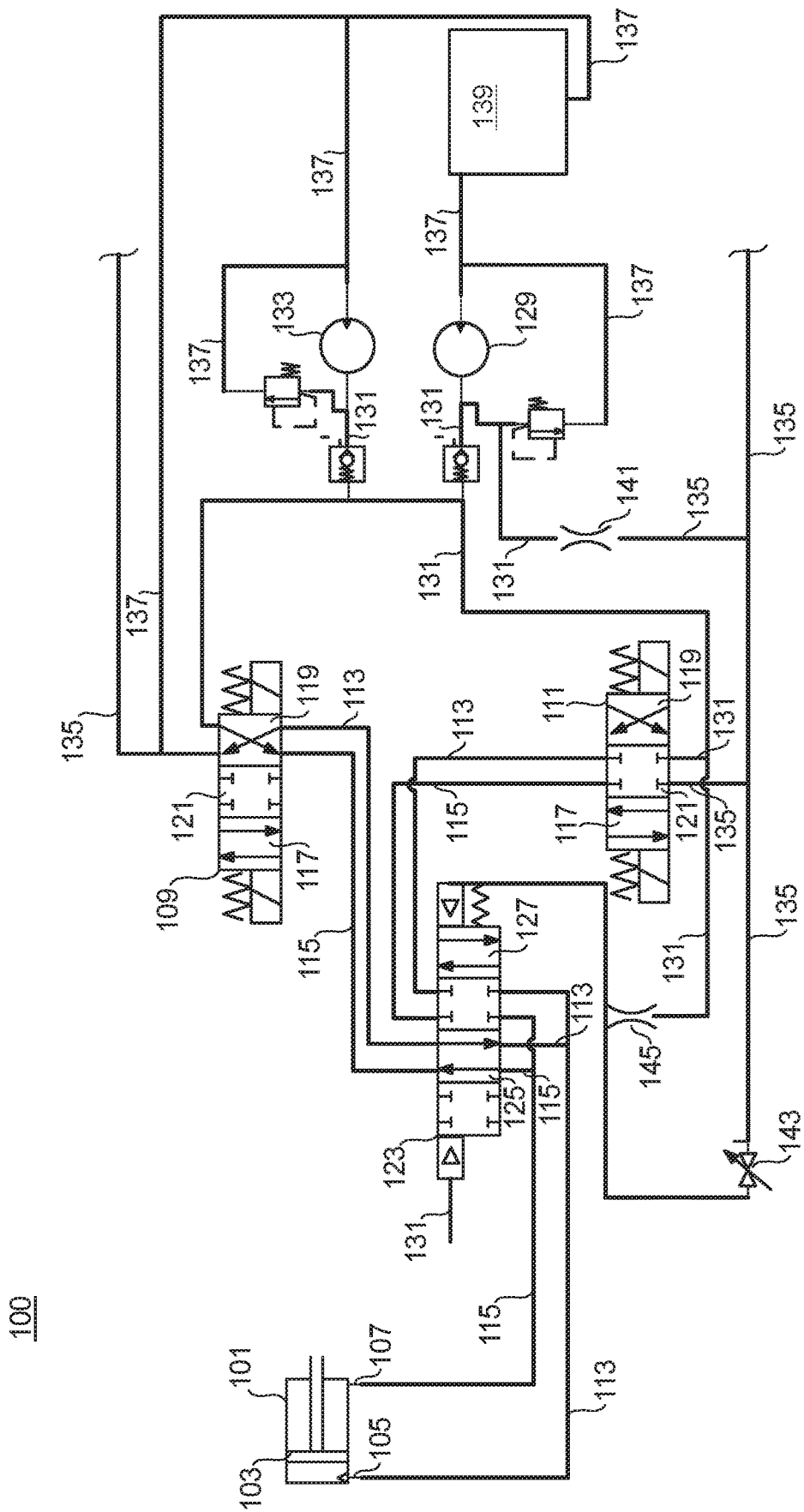
FIG. 3 is a schematic diagram the embodiment of FIG. 1, showing the first valve in a second open state, the second valve in a closed state, and the selection valve in a first selection state.

FIG. 2 shows the first valve in a first open state, the second valve in a closed state, and the selection valve in a first selection state. FIG. 3 shows the first valve in a second open state, the second valve in a closed state, and the selection valve in a first selection state.

Figure 4:
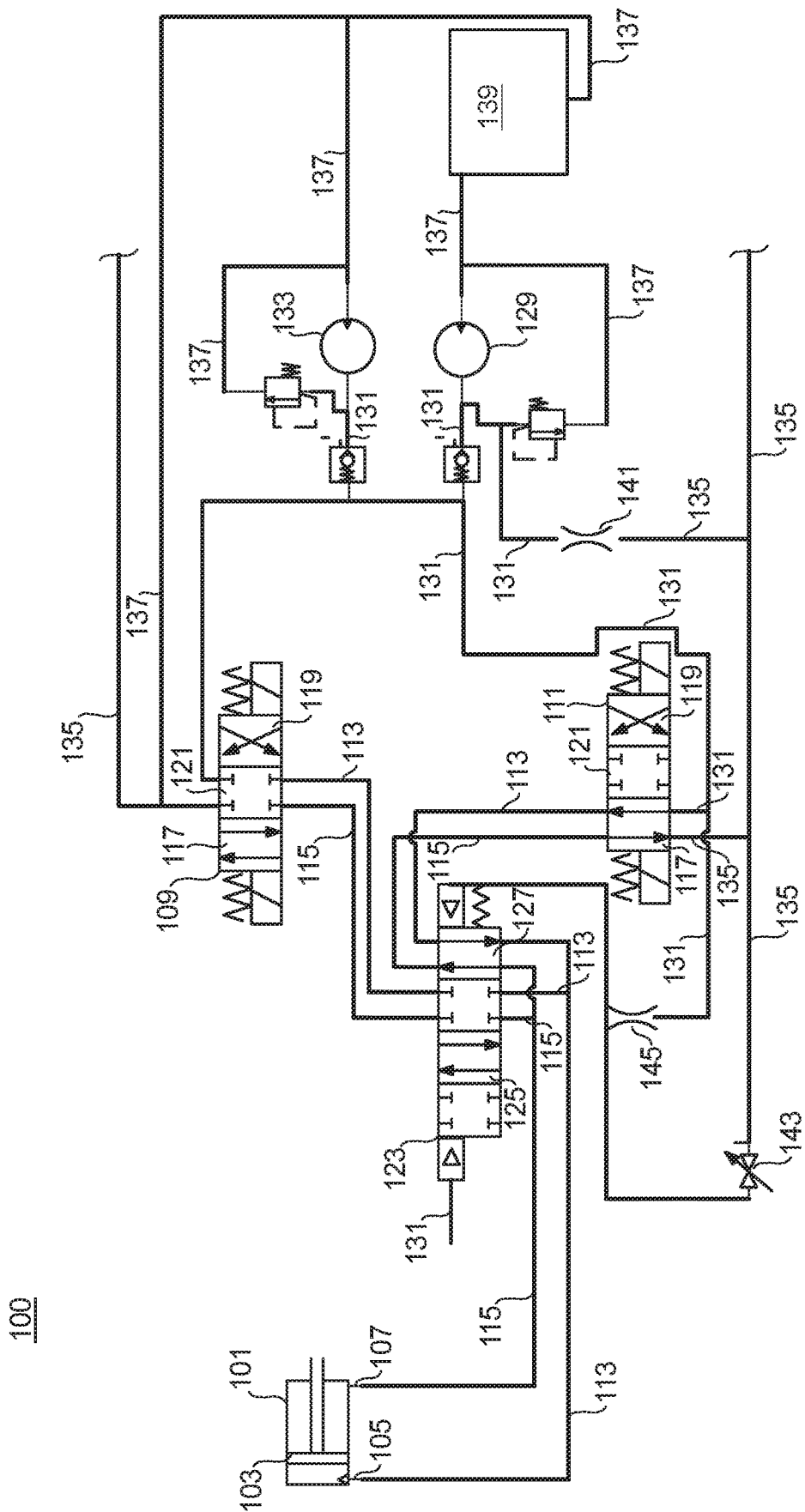
FIG. 4 is a schematic diagram the embodiment of FIG. 1, showing the first valve in a closed state, the second valve in a first open state, and the selection valve in a second selection state.
Figure 5:
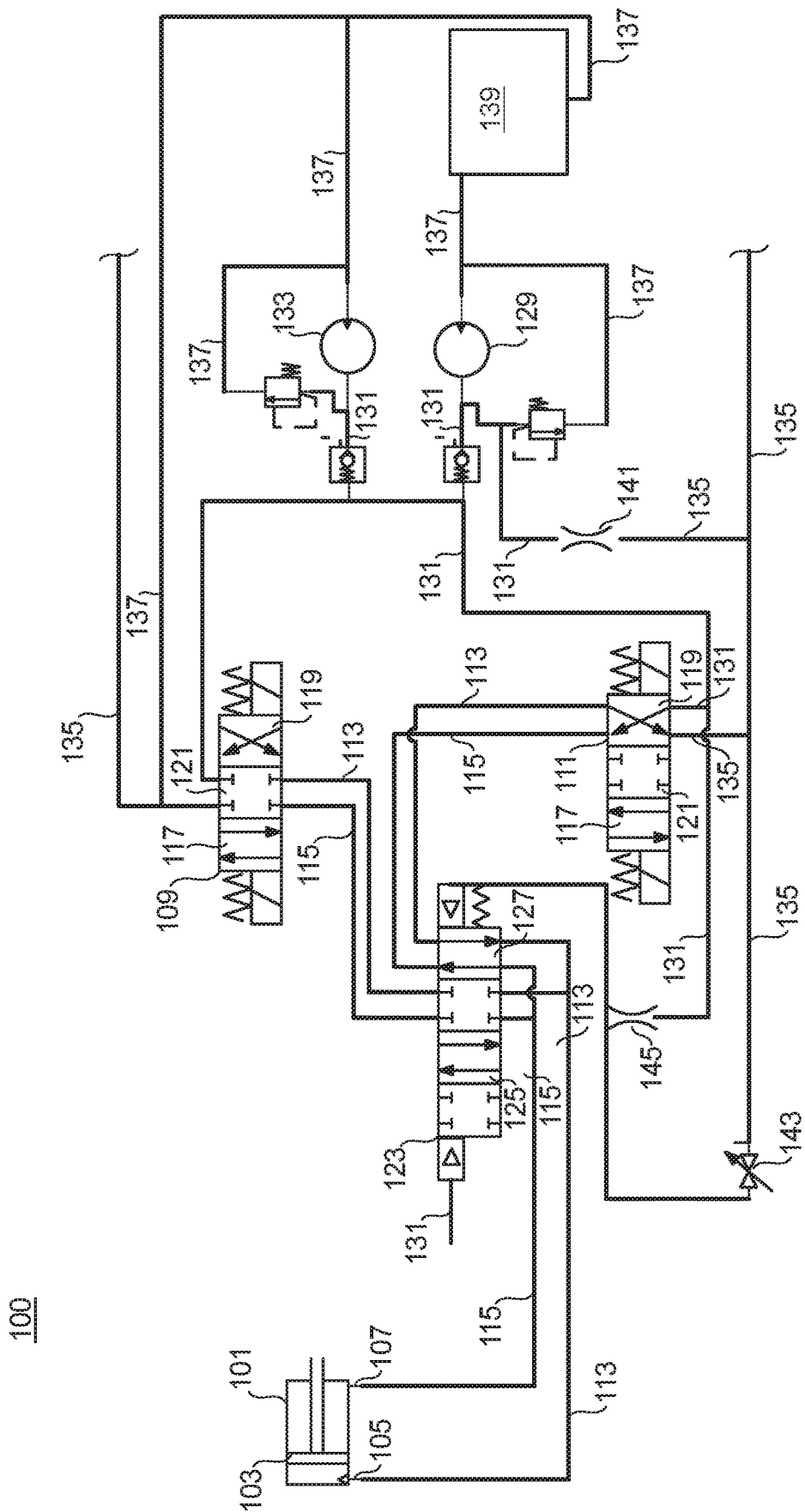
FIG. 5 is a schematic diagram the embodiment of FIG. 1, showing the first valve in a closed state, the second valve in a second open state, and the selection valve in a second selection state.

FIG. 4 shows the first valve in a closed state, the second valve in a first open state, and the selection valve in a second selection state. FIG. 5 shows the first valve in a closed state, the second valve in a second open state, and the selection valve in a second selection state;

FIG. 6 shows the first valve in a first null state, the second valve in a second null state, and the selection valve in a first selection state to bias the actuator in a first direction. FIG. 7 shows the first valve in a first null state, the second valve in a second null state, and the selection valve in a second selection state to bias the actuator in a second direction.

In accordance with at least one aspect of this disclosure, a system for controlling propeller pitch in the event of electro-hydraulic servo valve (EHSV) failure includes an actuator and a selection valve in fluid communication with the actuator. The selection valve can be fluid communication with a first EHSV having a first null state bias configured to bias the actuator to an increased-pitch position, and a second EHSV having a second null state bias configured to bias the actuator to a decreased-pitch position. The selection valve can be configured to selectively allow fluid communication between one of the first EHSV and actuator and/or the second EHSV and the actuator.

In certain embodiments, e.g., for embodiments having opposite null biases, the selection valve 123 can be controlled in oscillatory manner between positions to maintain actuator position (e.g., for blade pitch) within a range of positions (e.g., for maintaining a range of blade pitch) for continued operation. Any suitable control scheme is contemplated herein.

In accordance with at least one aspect of this disclosure, a method can include operating an actuator in an actuator control valve failure mode to control a position of the actuator by controlling a selection valve disposed between the actuator to select between a first actuator control valve and a second actuator control valve to select between an actuator extend bias of the first actuator control valve and an actuator deploy bias of the second actuator control valve. The method can include oscillating the position of the selection valve to maintain a predetermined range of actuator positions.

Dual valve configurations as disclosed herein can simplify the control system by making the control system more robust with improved performance during degraded operation. The primary valve (e.g., an EHSV) can have a bias toward decrease pitch. This can perform blade angle and speed control under most operations. The backup valve (e.g., an EHSV) can provide a redundant system with a bias toward increase pitch. The backup is selectable via a selection valve (e.g., a two position protection valve which is not used for primary or backup control). Should both primary and backup valves fail the protection valve could be used to attempt continued operation with the null bias of each valve providing the increase and decrease pitch flows. In case of this third operational mode failure the selection valve can be configured to increase pitch toward feather. The selection valve can be simplified and improved in robustness due to its forceful hydraulics and non-regulating function. The system can also incorporate an improved cooling orifice from existing systems by moving it upstream of a check valve. This can result in less leakage during an auxiliary pump operation and can result in longer availability of the auxiliary pump. Certain embodiments can rout the valve return to an aux and/or main tank. This can enable extended operation on the auxiliary pump during critical phases of the flight by creating a closed loop hydraulic circuit.

Embodiments allow up and down pitching even with a single or double failure of the control valves. Embodiments can include an improved commuter propeller system architecture incorporating dual EHSV controls. Embodiments of a hydraulic control system can include two EHSV's (one primary and one backup with opposite bias directions) and a two or more position selection valve. Additionally a cooling orifice can be arranged such that auxiliary pump operation could be extended due to reduced leakage levels (e.g., potentially for several minutes).

Embodiments improve reliability of control systems due to a redundant control system and a third backup operational mode (selection valve shuttling between null bias conditions). Embodiments result in greater system redundancy, more robust backup operation and less operational downtime. System complexity is also reduced by eliminating the overspeed governor (or similar hardware to an overspeed governor) and other components. Extended operation on an auxiliary pump can be possible as well.

The methods and systems of the present disclosure, as described above and shown in the drawings, provide for control systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:
1. An actuator system, comprising:
  a pressure actuator having a piston, at least a first port and second port, wherein the first port is on a first pressure side of the piston and the second port is on a second pressure side of the piston;

a first valve and a second valve in selective fluid communication with the first port and the second port of the pressure actuator via at least one first port line and at least one second port line, each of the first and second valve having a first open state, a second open state, and a closed state such that the first open state allows a pressure differential between the first port and the second port such that the actuator is biased to an extended position when one of the first and second valves is in fluid communication with the actuator and in the first open state, wherein the second open state allows a pressure differential between the first port and the second port such that the actuator is biased to a retracted position when one of the first and second valves is in fluid communication with the actuator and in the second open state, wherein the first valve includes a first null state in the event of a failure of the first valve such that first null state allows a pressure differential between the first port and the second port such that the actuator is biased to a first direction when the first valve is in fluid communication with the actuator and is in the first null state, wherein the second valve includes a second null state in the event of a failure of the second valve such that second null state allows a pressure differential between the first port and the second port such that the actuator is biased to a second direction when the second valve is in fluid communication with the actuator and is in the second null state;

a selection valve in fluid communication between the actuator and the first and second valves, wherein the selection valve is configured to move between at least a first selection state to select the first valve to fluidly communicate with the actuator and a second selection state to select the second valve to fluidly communicate with the actuator;

a main pump in fluid communication with the first valve and second valve via a pump line; and a low pressure line connected to the first valve and the second valve, wherein the low pressure line configured to carry a lower pressure than the pump line, wherein the selection valve is configured to be hydraulically actuated between the first selection position and the second selection position by being connected to the pump line on one side and selectively connected to the low pressure line via a solenoid and to the pump line via an orifice on another side.

2. The system of claim 1, wherein the actuator is a propeller pitch actuator.

3. The system of claim 2, wherein the first direction is an increase-pitch direction.

4. The system of claim 3, wherein the second direction is a decrease-pitch direction.

5. The system of claim 1, further comprising an auxiliary pump in fluid communication with the first valve and second valve via the pump line.

6. The system of claim 1, wherein the lower pressure is an atmospheric pressure.

7. The system of claim 5, further comprising a return line in fluid communication with at least one of the first valve and the second valve for returning hydraulic fluid to a tank and/or to a low pressure pump side.

8. The system of claim 7, wherein the return line is connected to the low pressure line.

9. The system of claim 1, further comprising a cooling orifice connected between the pump line and the low pressure line.

10. The system of claim 1, wherein the first valve and the second valve are electro-hydraulic servo valves (EHSVs).

11. The system of claim 4, wherein the selection valve includes a null state in the event of failure of the selection valve to such that the actuator is biased to a high pitch direction for feathering a propeller.

* * * * *